(12) United States Patent
Yu et al.

(10) Patent No.: US 11,333,277 B2
(45) Date of Patent: May 17, 2022

(54) SEALING VIBRATIONAL-COUNTERROTATION-PROOF HOSE JOINT

(71) Applicant: JIAXING SHENG YANG ELECTRIC CO., LTD., Jiaxing (CN)

(72) Inventors: Zhiming Yu, Hanchuan (CN); Xiaoyuan Xu, Wuxi (CN)

(73) Assignee: JIAXING SHENG YANG ELECTRIC CO., LTD.

( * ) Notice: Subject to any disclaimer, the term of this patent is extended or adjusted under 35 U.S.C. 154(b) by 390 days.

(21) Appl. No.: 16/474,064

(22) PCT Filed: Sep. 30, 2018

(86) PCT No.: PCT/CN2018/108957
§ 371 (c)(1),
(2) Date: Jun. 27, 2019

(87) PCT Pub. No.: WO2020/037786
PCT Pub. Date: Feb. 27, 2020

(65) Prior Publication Data
US 2021/0332921 A1    Oct. 28, 2021

(30) Foreign Application Priority Data

Aug. 24, 2018   (CN) .......................... 201810969955.6

(51) Int. Cl.
*F16L 37/10*      (2006.01)
*F16L 25/00*      (2006.01)

(52) U.S. Cl.
CPC ......... *F16L 25/0045* (2013.01); *F16L 37/101* (2013.01)

(58) Field of Classification Search
CPC .............................. F16L 25/0045; F16L 37/101
See application file for complete search history.

(56) References Cited

U.S. PATENT DOCUMENTS

| | | | | |
|---|---|---|---|---|
| 919,743 A | * | 4/1909 | Mason | F16L 37/248 285/361 |
| 2,230,098 A | * | 1/1941 | Wurzburger | F16L 37/248 285/90 |

(Continued)

FOREIGN PATENT DOCUMENTS

| | | | | |
|---|---|---|---|---|
| DE | 102007040745 B3 | * | 11/2008 | .......... F16L 25/0045 |
| DE | 102011085398 A1 | * | 5/2013 | .......... H02G 3/0691 |
| DE | 102015118546 A1 | * | 5/2017 | .......... F16L 25/0045 |

OTHER PUBLICATIONS

Machine translation of the descriptive portion of DE102015118546, taken from the EPO, on Sep. 9, 2021.*

*Primary Examiner* — Matthew Troutman
*Assistant Examiner* — James A Linford

(57) ABSTRACT

A sealing vibrational-counterrotation-proof hose joint capable of solving the poor sealing performance and the poor vibrational-counterrotation-proof performance of the prior hose joints, comprising a joint main body and a screw cap; a connecting section is arranged on the joint main body, and the screw cap is connected to the connecting section; the connecting section is provided with hooking claws; a squeezing section is arranged on the screw cap, and the squeezing section can squeeze the hooking claws, thereby enabling the hooking claws to bend towards the central axis of the joint main body; the screw cap is provided with locking blocks; the side wall of the connecting section is provided with locking grooves and a plurality of spiral guide bars; the spiral guide bars are uniformly distributed in a circumferential direction by taking the central axis of the joint main body as the center.

5 Claims, 2 Drawing Sheets

(56) References Cited

U.S. PATENT DOCUMENTS 2,450,527 A * 10/1948 Smith .................. F16L 37/248
 285/85
4,708,370 A * 11/1987 Todd .................. F16L 25/0045
 277/615

* cited by examiner

SEALING VIBRATIONAL-COUNTERROTATION-PROOF HOSE JOINT

TECHNICAL FIELD OF THE INVENTION

The present invention relates to the technical field of hose joints, and more particularly, to a sealing vibrational-counterrotation-proof hose joint.

BACKGROUND OF THE INVENTION

In the prior art, traditional hose joints are normally buckle-type quick-inserting capable of rapid assembly and disassembly. The structure mainly comprises a screw cap and a main body, wherein four hooking claws are arranged on the screw cap, hooking parts are arranged on both the inner and outer sides of each hooking claw, and grooves that can axially and fixedly interact with the hooking parts on the outer side of the hooking claws are formed in the main body. Through the interaction between the grooves and the hooking parts on the outer side of the hooking claws, the screw cap and the main body can be detachably connected. When the hose is inserted into the hollow part of the main body, the hooking parts on the inner side of the hooking claws interact with the grooves in the hose so that the hose can be tightly clamped in the joint. This structure is simple, and can be quickly assembled and disassembled, allowing the hose to be rapidly inserted and pulled out. However, due to the large gap between the screw cap and the main body, and the oscillating gap between the hose and the hooking claws, the hose cannot be effectively sealed and protected.

Another hose joint in the prior art is a knob-type hose joint, which also comprises a screw cap and a main body, wherein threads are formed in the main body and the screw cap. Through the clockwise rotation of the screw cap, the main body and the screw cap can be connected tightly. The head of the screw cap is provided with a guide section with a specific angle. When the screw cap is screwed, the guide section can squeeze the sealing ring, thereby enabling the sealing ring to deform gradually to wrap and fix the hose. However, during the high-speed operation of the machine, the screw cap can easily counter-rotate due to the vibration, causing hidden dangers of the aforesaid threaded connection. Moreover, although the hose can be fixed through the shape change of the sealing ring, the pulling resistance of the hose is poor.

In conclusion, it's urgent for those skilled in this field to develop a novel hose joint.

SUMMARY OF THE INVENTION

The purpose of the present invention is to solve the shortcomings in the prior art by providing a sealing vibrational-counterrotation-proof hose joint, which not only can effectively seal the hose, but also can prevent the screw cap from counterrotating relative to the main body due to the vibration.

To achieve the above purpose, the present invention adopts the following technical solution:

A sealing vibrational-counterrotation-proof hose joint comprising a joint main body and a screw cap, wherein a connecting section is arranged on the joint main body, and the screw cap is connected to the connecting section; the connecting section is provided with hooking claws; a squeezing section is arranged on the screw cap; the squeezing section can squeeze the hooking claws, thereby enabling the hooking claws to bend towards the central axis of the joint main body; the screw cap is provided with locking blocks; the side wall of the connecting section is provided with locking grooves and a plurality of spiral guide bars; the spiral guide bars are uniformly distributed in a circumferential direction by taking the central axis of the joint main body as the center; a spiral guide groove for guiding the locking block is formed between every two adjacent spiral guide bars; the locking grooves are respectively formed at the tail end of the spiral guide groove, allowing the locking blocks to be clamped and locked therein.

In another preferred embodiment, an anti-falling ring for preventing the screw cap from falling off is arranged at the end of the connecting section.

In another preferred embodiment, a guide slope for allowing the locking block to slide through the anti-falling ring is formed at the end of the connecting section.

In another preferred embodiment, the locking groove is formed by two protruding blocks arranged along the extension direction of the spiral guide groove.

In another preferred embodiment, the side wall of the protruding block that is opposite to the locking groove is provided with an inclined portion.

In another preferred embodiment, a sealing ring is arranged in the connecting section.

In another preferred embodiment, the diameter of the squeezing section is gradually reduced from the end facing towards the hooking claw to the end opposite to the hooking claw.

In another preferred embodiment, the hose joint further comprises a threaded connection section, and a nut is connected with the threaded connection section.

Compared with the prior art, the present invention has the following advantages:

Through the rotational interaction between the locking blocks and the spiral guide grooves, ideal sealing and fixing effects can be achieved. Moreover, through the interaction between the locking blocks and the locking grooves, the screw cap can be prevented from counterrotating relative to the main body due to the vibration.

DETAILED DESCRIPTION OF THE INVENTION

Figure 1:
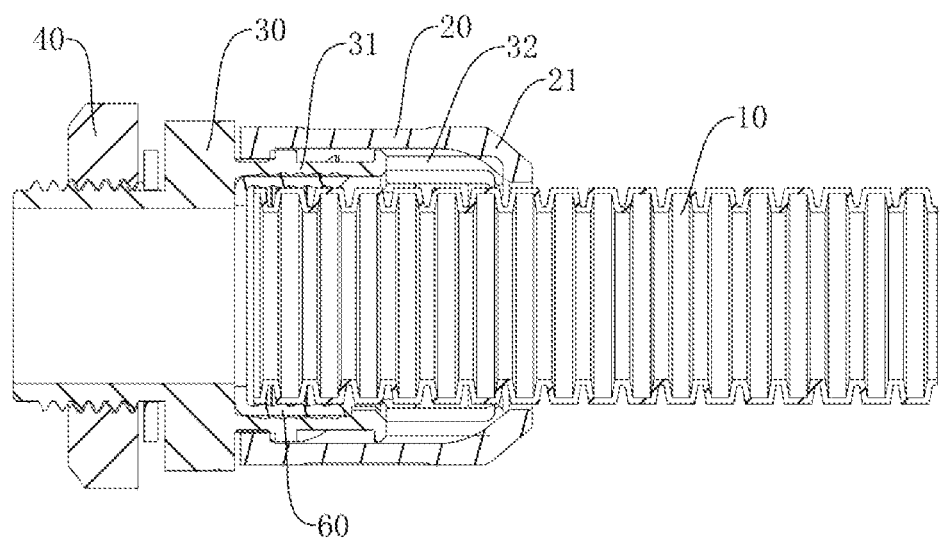
FIG. 1 is a sectional view of the sealing vibrational-counterrotation-proof hose joint of the embodiment.
Figure 2:
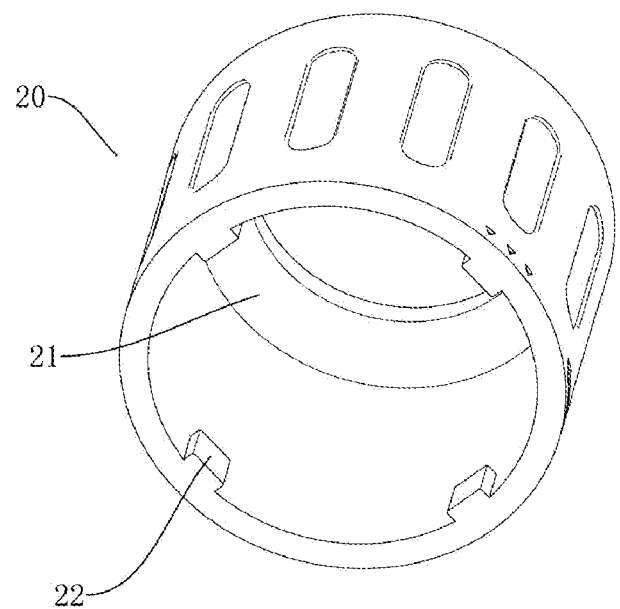
FIG. 2 is a schematic diagram of the screw cap of the embodiment.
Figure 3:
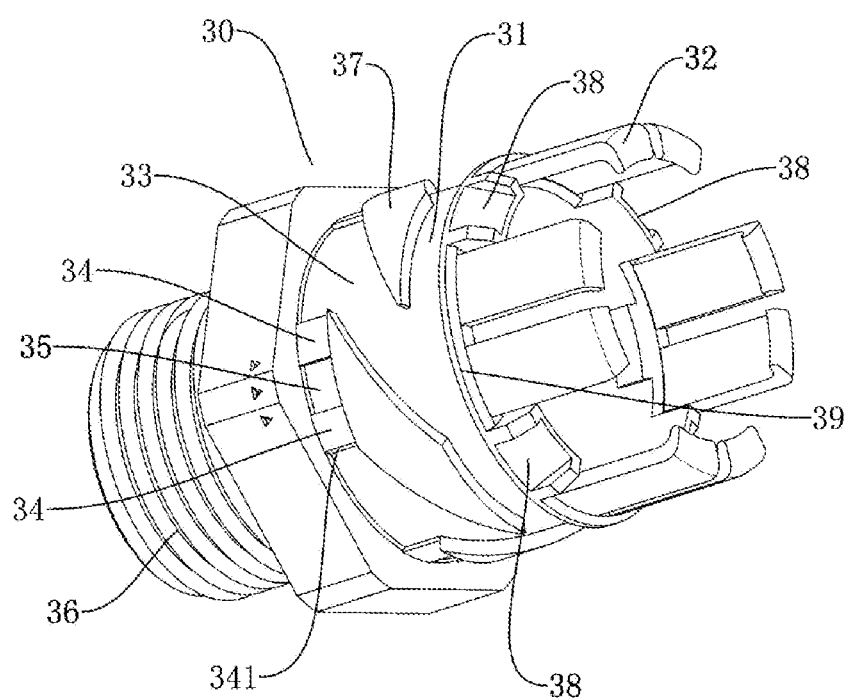
FIG. 3 is a schematic diagram of the joint main body of the embodiment.

FIGS. 1-3 are combined to further elaborate the sealing vibrational-counterrotation-proof hose joint of the present invention.

The sealing vibrational-counterrotation-proof hose joint comprises a joint main body 30 and a screw cap 20, wherein a connecting section 31 is arranged on the joint main body 30, and the screw cap 20 is connected to the connecting section 31.

The connecting section 31 is provided with hooking claws 32. In this embodiment, there're four groups of hooking claws 32, and each group comprises two hooking claws 32. The four groups of hooking claws 32 are circumferentially and uniformly arranged around the central axis of the joint main body 30. A squeezing section 21 is arranged on the screw cap 20. The squeezing section 21 can squeeze the hooking claws 32, thereby enabling the hooking claws 32 to be bent towards the central axis of the joint main body 30. Namely, during the course that the screw cap is assembled to the joint main body 30, the squeezing section 21 squeezes the hooking claws 32 towards the central axis of the joint main body 30. Four locking blocks 22 are arranged on the screw cap, and the four locking blocks 22 are uniformly distributed in a circumferential direction by taking the central axis of the screw cap as the center. The side wall of the connecting section 31 is provided with four locking grooves 35 and four spiral guide bars 37. The spiral guide bars 37 are uniformly distributed in a circumferential direction by taking the central axis of the joint main body 30 as the center. A spiral guide groove 33 for guiding the locking block 22 is formed between every two adjacent spiral guide bars 37. The four locking grooves 35 are respectively formed at the tail end of the spiral guide groove 33, allowing the locking blocks 22 to be clamped and locked therein.

Further, an anti-falling ring 39 for preventing the screw cap from falling off is arranged at the end of the connecting section 31. The anti-falling ring 39 can effectively prevent the screw cap from falling off from the main body after being installed. Thus, the structural stability is guaranteed, and the safety and reliability are ensured.

Further, a guide slope 38 for allowing the locking block 22 to slide through the anti-falling ring 39 is formed at the end of the connecting section 31. According to this design, the locking block 22 can conveniently slide through the anti-falling ring 39 to be clamped into the joint main body 30.

Further, the locking groove 35 is formed by two protruding blocks 34 arranged along the extension direction of the spiral guide groove 33.

Further, the side wall of the protruding block 34 that is opposite to the locking groove 35 is provided with an inclined portion 341, which enables the locking block 22 to conveniently slide into the locking groove 35 under the guide of the spiral guide groove 33. Thus, the screw cap can be locked and prevented from being rotated.

Further, a sealing ring 60 is arranged within the connecting section. In this embodiment, the inner diameter and the outer diameter of the sealing ring 60 are wave-shaped, enabling the hose to be firmly clamped in the sealing ring 60. Meanwhile, the sealing ring 60 is tightly connected with the interior of the joint main body 30, ensuring a high waterproof performance. Moreover, for the sealing ring 60 is located inside the main body after being assembled, the overall size of the joint is reduced, achieving a convenient use in a narrow space.

Further, the diameter of the squeezing section 21 is gradually reduced from the end facing towards the hooking claw 32 to the end opposite to the hooking claw 32. In this way, when the screw cap moves to the joint main body 30, the hooking claws 32 can be squeezed by the squeezing section 21.

Further, the hose joint further comprises a threaded connection section 36, and a nut 40 is connected with the threaded connection section 36.

During use, the sealing ring 60 is first placed into the joint main body 30, and the four locking blocks 22 at the bottom of the screw cap are aligned to the four guide slopes 38 on the joint main body 30. At this point, by slightly pushing the screw cap, the screw cap can be quickly connected with the joint main body 30. Namely, the early-stage preparations of the screw cap and the joint main body 30 are completed. Due to the anti-falling ring 39 arranged on the main body, the screw cap cannot be pulled off after being installed. When there's a need to install a hose, the hose is aligned and inserted into the hollow part in the joint main body 30, and the the screw cap is screwed for one-fourth circle. Thus, the locking blocks 22 in the screw cap can precisely enter into the locking grooves 35 along the spiral guide grooves 33 on the connecting section 31, and are firmly clamped in the locking grooves 35. Meanwhile, the hooking claws 32 are naturally bent under the action of the squeezing section 21 on the screw cap, and are firmly clamped in the grooves of the hose.

In the above embodiment, the connecting section of the joint main body 30 is provided with eight hooking claws 32, which can firmly catch the hose when being squeezed to bend naturally, thereby guaranteeing the connection stability of the hose. Meanwhile, the deeper the bending depth of the hooking claws 32 is, the tighter the hooking claws 32 catch the hose, and the stronger the pulling resistance is. After the screw cap is tightly screwed, the four locking blocks 22 can be clamped into the four locking grooves 35 formed by the eight protruding blocks 34 on the connecting section 31. Thus, the hidden danger caused by the vibrational counter-rotation can be avoided.

The above are merely preferred embodiments of the invention, and the protection range of the present invention is not limited to the above described embodiments only. Any variations within the range of purposes and principles of the present invention shall be included in the protection range of the invention. It should be noted that the improvements and the embellishments within the scope of the tenets of the invention shall be within the protection range of the invention to the skilled in this field.

The invention claimed is:

1. A sealing vibrational-counterrotation-proof hose joint, comprising:
   a joint main body, and
   a screw cap,
   wherein a connecting section is arranged on the joint main body, and the screw cap is connected to the connecting section, wherein the connecting section is provided with hooking claws, wherein a squeezing section is arranged on the screw cap, wherein the squeezing section can squeeze the hooking claws, thereby enabling the hooking claws to bend towards a central axis of the joint main body, wherein the screw cap is provided with locking blocks, wherein a side wall of the connecting section is provided with locking grooves and a plurality of spiral guide bars, wherein the spiral guide bars are uniformly distributed in a circumferential direction by taking the central axis of the joint main body as the center, wherein a spiral guide groove for guiding the locking block is formed between every two adjacent spiral guide bars, wherein the locking grooves are respectively formed at a tail end of the spiral guide groove, allowing the locking blocks to be clamped and locked therein, wherein an anti-falling ring for preventing the screw cap from falling off is arranged at an end of the connecting section, wherein a guide slope for allowing the locking block to slide through the anti-falling ring is formed at the end of the connecting section, wherein at least one of the locking groove is formed by two protruding blocks, respectively arranged along the extension direction of the spiral guide groove.

2. The sealing vibrational-counterrotation-proof hose joint of claim 1, wherein the side wall of the protruding block that is opposite to the locking groove is provided with an inclined portion.

3. The sealing vibrational-counterrotation-proof hose joint of claim 1, wherein a sealing ring is arranged in the connecting section.

4. The sealing vibrational-counterrotation-proof hose joint of claim 1, wherein a diameter of the squeezing section is gradually reduced from the end facing towards the hooking claw to the end opposite to the hooking claw.

5. The sealing vibrational-counterrotation-proof hose joint of claim 1, wherein the hose joint further comprises a threaded connection section, and a nut is connected with the threaded connection section.

* * * * *